(12) United States Patent
Bayley et al.

(10) Patent No.: US 6,431,588 B1
(45) Date of Patent: Aug. 13, 2002

(54) INFLATABLE SIDE CURTAIN WITH TENSIONING DEVICE

(75) Inventors: Gregory S. Bayley, Dryden; Douglas P. Campbell, Metamora, both of MI (US)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 0 days.

(21) Appl. No.: 09/657,059

(22) Filed: Sep. 7, 2000

(51) Int. Cl.$^7$ .............................................. B60R 21/22
(52) U.S. Cl. ..................................... 280/730.2; 280/749
(58) Field of Search ........................... 280/730.2, 730.1, 280/749, 751, 753

(56) References Cited

U.S. PATENT DOCUMENTS

| | | | |
|---|---|---|---|
| 5,480,181 A | 1/1996 | Bark et al. | 280/729 |
| 5,788,270 A | 8/1998 | Haland et al. | 280/729 |
| 6,155,597 A | * 12/2000 | Bower et al. | 280/730.2 |
| 6,168,193 B1 | * 1/2001 | Shirk et al. | 280/730.2 |
| 6,168,194 B1 | * 1/2001 | Cuevas et al. | 280/730.2 |
| 6,203,058 B1 | * 3/2001 | Elqadah et al. | 280/729 |

FOREIGN PATENT DOCUMENTS

| | | |
|---|---|---|
| DE | 19519297 | 12/1995 |
| EP | 0798172 | 1/1997 |
| WO | 9521753 | 8/1995 |
| WO | 9807598 | 2/1998 |

\* cited by examiner

*Primary Examiner*—Eric Culbreth
(74) *Attorney, Agent, or Firm*—Tarolli, Sundheim, Covell, Tummino & Szabo L.L.P.

(57) ABSTRACT

Apparatus (10) for helping to protect an occupant of a vehicle (12) that has a side structure (16) and a roof (18) includes an inflatable vehicle occupant protection device (14) inflatable between the side structure and a vehicle occupant. A first tensioning device (70) is actuatable to move a piston (124) from a first position towards a second position in a cylinder (122). A first flexible elongated member (72) has a first (74) end connected to the vehicle side structure (16), an opposite second end (80) connected to the piston (124), and an intermediate portion (82) that extends through the inflatable device (14). When the first tensioning device (70) is actuated, the piston (124) moves the second end (80) in a first direction, which tensions the first member (72) and helps to move the inflatable device (14) towards the deployed position. The inflatable device (14) resists movement of the piston (124) in the first direction. The resistance increases to a point at which the resistance prevents movement of the piston (124) towards the second position.

43 Claims, 3 Drawing Sheets

INFLATABLE SIDE CURTAIN WITH TENSIONING DEVICE

FIELD OF THE INVENTION

The present invention relates to an inflatable apparatus for helping to protect a vehicle occupant in the event of a side impact to a vehicle and/or a vehicle rollover.

BACKGROUND OF THE INVENTION

It is known to inflate an inflatable vehicle occupant protection device to help protect a vehicle occupant in the event of a vehicle collision. One particular type of inflatable vehicle occupant protection device is an inflatable curtain that inflates from the roof of the vehicle downward inside the passenger compartment between a vehicle occupant and the side structure of the vehicle in the event of a side impact or rollover. A known inflatable curtain is inflated from a deflated condition by inflation fluid directed from an inflator to the inflatable curtain through a fill tube.

SUMMARY OF THE INVENTION

The present invention relates to an apparatus for helping to protect an occupant of a vehicle that has a side structure and a roof. The apparatus comprises an inflatable vehicle occupant protection device that is inflatable away from the vehicle roof into a deployed position between the side structure of the vehicle and a vehicle occupant. An inflation fluid source is actuatable to provide inflation fluid for inflating the inflatable vehicle occupant protection device.

A first tensioning device includes a cylinder, a piston that is slidable in the cylinder, and a fluid source actuatable to provide fluid for moving the piston from a first position towards a second position in the cylinder. A first flexible elongated member has a first end connected to the vehicle side structure and an opposite second end connected to the piston. The first flexible elongated member has an intermediate portion between the first and second ends extending through the inflatable vehicle occupant protection device.

The fluid source is actuated when the inflation fluid source is actuated. The piston moves the second end of the first flexible elongated member in a first direction, which tensions the first member and helps to move the inflatable vehicle occupant protection device towards the deployed position. The inflatable vehicle occupant protection device resists movement of the piston in the first direction by applying force to the intermediate portion of the first member. The resistance increases to a point at which the resistance prevents movement of the piston towards the second position.

The apparatus also comprises an inflatable vehicle occupant protection device that is inflatable away from the vehicle roof into a deployed position between the side structure of the vehicle and a vehicle occupant. An inflation fluid source is actuatable to provide inflation fluid for inflating the inflatable vehicle occupant protection device.

A first tensioning device is connected to the inflatable vehicle occupant protection device at a first location on the inflatable vehicle occupant protection device. The first tensioning device tensions the inflatable vehicle occupant protection device in a first direction towards the deployed position and resists movement of the inflatable vehicle occupant protection device in a direction opposite the first direction.

A second tensioning device is connected to the inflatable vehicle occupant protection device at a second location on the inflatable vehicle occupant protection device. The second tensioning device tensions the inflatable vehicle occupant protection device in a second direction, different than the first direction, towards the deployed position. The second tensioning device resists movement of the inflatable vehicle occupant protection device in a direction opposite the second direction.

BRIEF DESCRIPTION OF THE DRAWINGS

The foregoing and other features of the present invention will become apparent to one skilled in the art to which the present invention relates upon consideration of the following description of the invention with reference to the accompanying drawings, in which.

DESCRIPTION OF PREFERRED EMBODIMENTS

Figure 1:
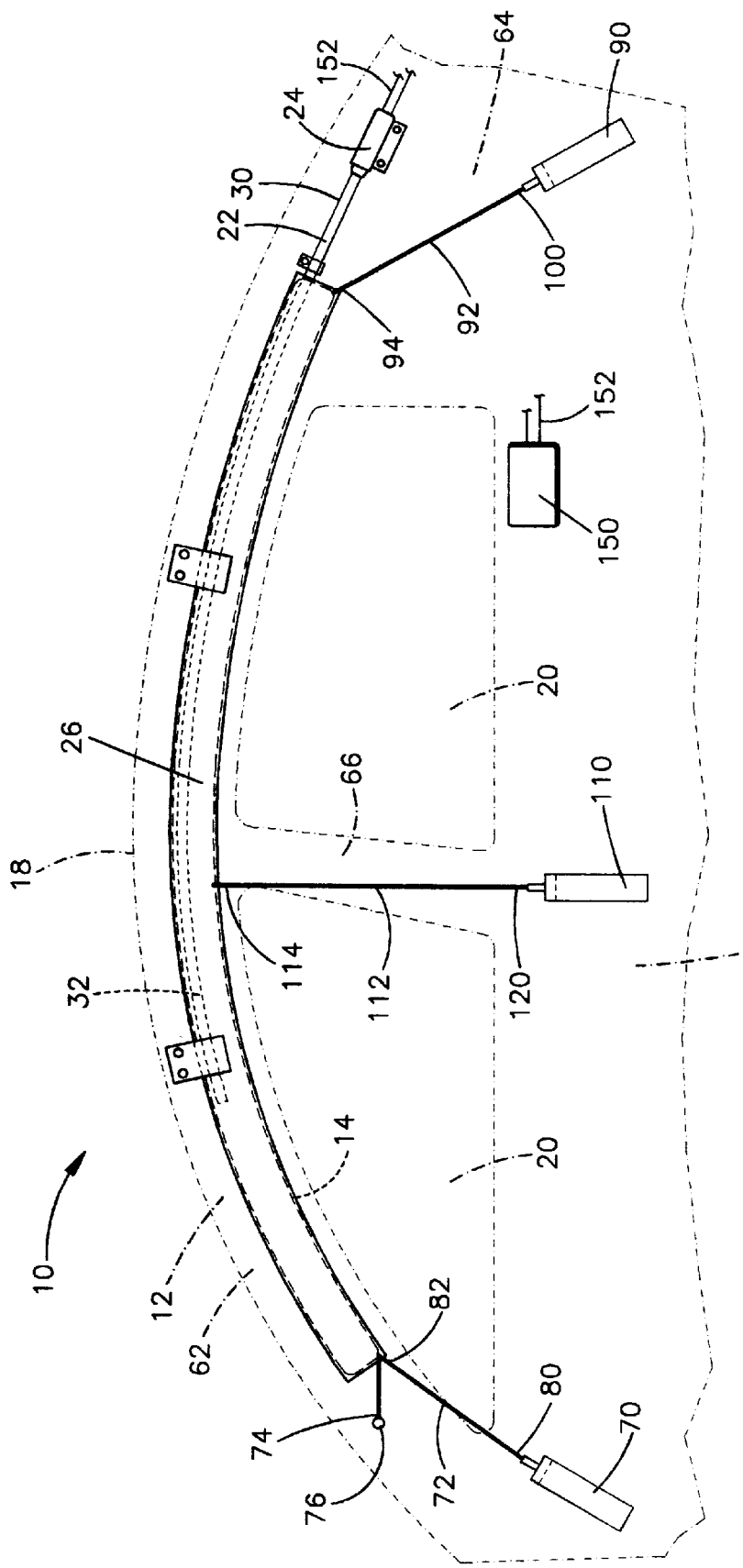
FIG. 1 is a schematic view of an inflatable apparatus for helping to protect an occupant of a vehicle according to a first embodiment of the present invention illustrating the apparatus in a deflated condition.
Figure 2:
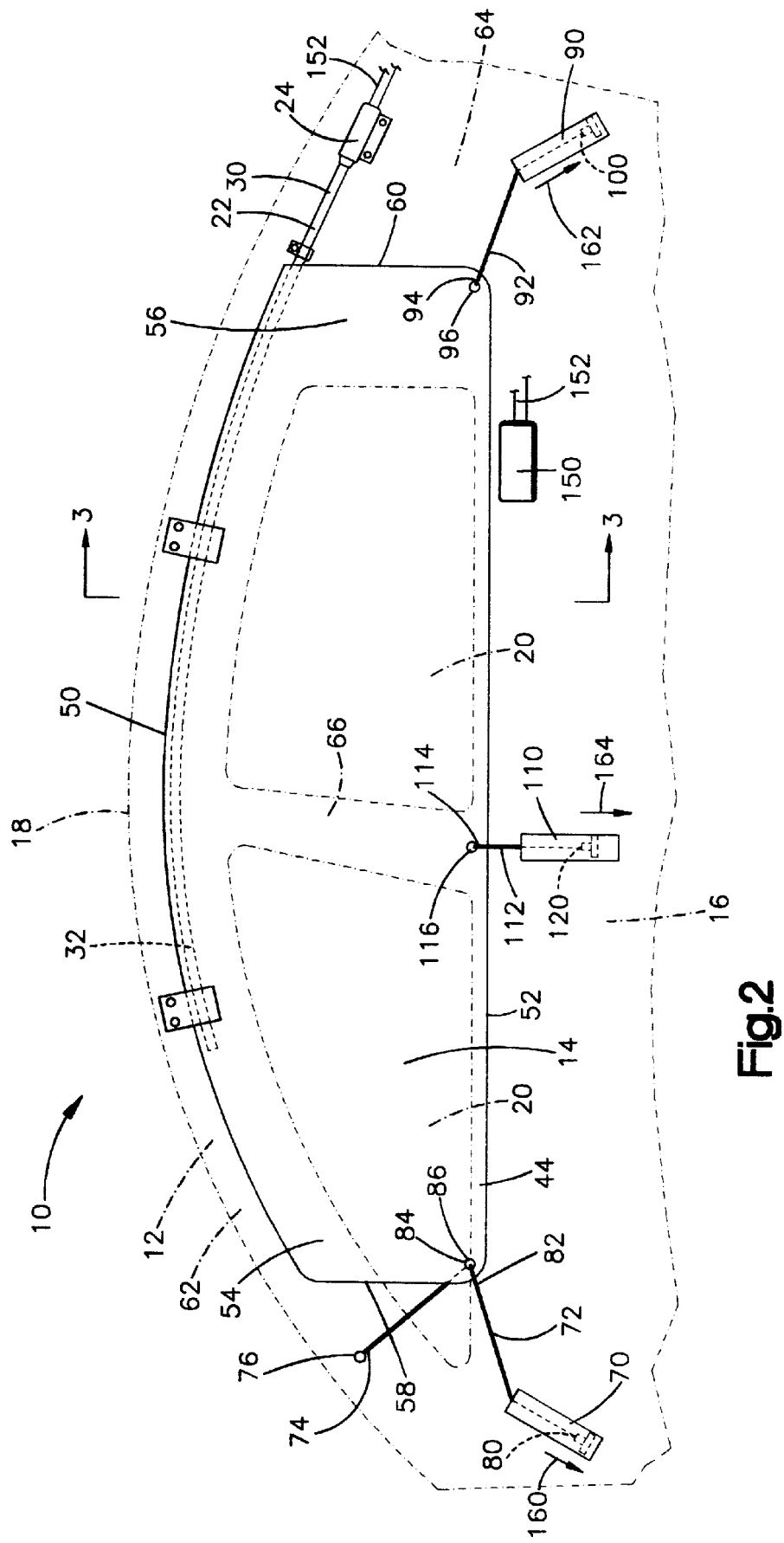
FIG. 2 is a schematic view of the apparatus of FIG. 1 in an inflated condition.

As representative of the present invention, an apparatus 10 helps to protect an occupant of a vehicle 12. As shown in FIGS. 1 and 2, the apparatus 10 includes an inflatable vehicle occupant protection device in the form of an inflatable curtain 14 that is mounted adjacent the side structure 16 of the vehicle 12 and a roof 18 of the vehicle. The side structure 16 of the vehicle 12 includes side windows 20. An inflator 24 is connected in fluid communication with the inflatable curtain 14 through a fill tube 22.

The fill tube 22 has a first end portion 30 for receiving fluid from the inflator 24. The fill tube 22 has a second end portion 32 disposed in the inflatable curtain 14. The fill tube 22 has a plurality of openings (not shown) that provide fluid communication between the fill tube 22 and the inflatable curtain 14.

The inflator 24 contains a stored quantity of pressurized inflation fluid (not shown) in the form of a gas to inflate the inflatable curtain 14. The inflator 24 alternatively could contain a combination of pressurized inflation fluid and ignitable material for heating the inflation fluid, or could be a pyrotechnic inflator that uses the combustion of gas-generating material to generate inflation fluid. As a further alternative, the inflator 22 could be of any suitable type or construction for supplying a medium for inflating the inflatable curtain 14.

The apparatus 10 includes a housing 26 (FIG. 1) that stores the inflatable curtain 14 in a deflated condition. The fill tube 22, the deflated inflatable curtain 14, and the housing 26 have an elongated configuration and extend along the vehicle roof 18 and along the side structure 16 of the vehicle 12 above the side windows 20.

Figure 3:
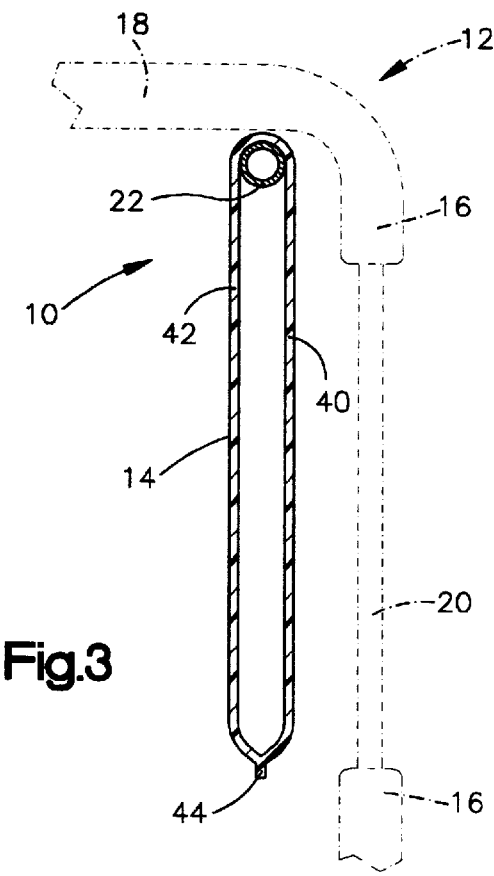
FIG. 3 is a sectional view of the apparatus taken generally along line 3—3 in FIG. 2.

As best illustrated in FIG. 3, the inflatable curtain 14 comprises first and second panels 40 and 42 that are arranged in an overlying manner. The first and second panels 40 and 42 are woven together along the perimeter 44 (FIGS.

2 and 3) of the panels to define an inflatable volume. The perimeter 44 is defined at least partially by an upper edge 50 (FIG. 2) of the inflatable curtain 14, an opposite lower edge 52 of the curtain, and front and rear portions 54 and 56, respectively, of the curtain spaced apart horizontally along the upper and lower edges.

In the embodiment illustrated in FIG. 2, the front and rear portions 54 and 56 of the inflatable curtain 14 are partially defined by front and rear edges 58 and 60, respectively, that extend between the upper and lower edges 50 and 52. The front and rear edges 58 and 60, however, could be omitted and the upper and lower edges 50 and 52 could be extended until they intersect, in which case the front and rear portions 54 and 56 would be defined by the intersecting upper and lower edges.

As illustrated in FIG. 3, the inflatable curtain 14 is woven as a single piece of material to form the overlying first and second panels 40 and 42. It will be recognized by those skilled in the art, however, that the inflatable curtain 14 could have alternative constructions. For example, the first and second panels 40 and 42 could be formed from a sheet of material that is folded over and secured along a portion of the perimeter 44 by means, such as stitching, to form the inflatable curtain 14. The first and second panels 40 and 42 could also be formed from separate sheets of material arranged in an overlying manner and secured together by means, such as stitching, that extends around the entire perimeter 44 of the panels to form the inflatable curtain 14.

The inflatable curtain is preferably constructed of a woven fabric, such as nylon, that is coated with a gas impermeable material, such as urethane or silicone. The inflatable curtain 14 thus may have a substantially gas-tight construction. Other materials, such as elastomers, plastic films, or combinations thereof may also be used to construct the inflatable curtain 14, in which case the curtain may have a non-woven construction. The materials used to construct the inflatable curtain 14 may also be single or multi-layered materials.

The apparatus 10 includes a first tensioning device 70 (shown schematically in FIGS. 1 and 2) connected to the vehicle side structure 16. The first tensioning device 70 may be positioned on or near an A pillar 62 of the vehicle. The apparatus 10 also includes a first flexible elongated member 72 that has a first end 74 connected to the vehicle side structure 16 at a location 76 on the side structure and an opposite second end 80 connected to the first tensioning device 70. The location 76 may be on or near the A pillar 62 and/or adjacent the intersection of the side structure 16 and the roof 18.

The first flexible elongated member 72 has an intermediate portion 82 between the first and second ends 74 and 80. The intermediate portion 82 extends through the inflatable curtain 14 at a location 84 (FIG. 2) on the front portion 54 of the curtain. The location 84 is adjacent the front edge 58 of the inflatable curtain 14 and may be adjacent the intersection of the front edge and the lower edge 52 of the curtain. The location 84 may comprise an aperture 86 in the inflatable curtain 14 or an element, such as a ring, that is connected to the curtain. The first flexible elongated member 72 may comprise any suitable means, such as a cable, rope, or tether.

The apparatus 10 may also include a second tensioning device 90 (shown schematically in FIGS. 1 and 2) connected to the vehicle side structure 16. The second tensioning device 90 may be positioned on or near a C pillar 64 of the vehicle. A second flexible elongated member 92 has a first end 94 connected to the inflatable curtain 14 at a location 96 (FIG. 2) on the rear portion 56 of the curtain and an opposite second end 100 connected to the second tensioning device 90. The location 96 is positioned adjacent the rear edge 60 of the inflatable curtain 14 and may be adjacent the intersection of the rear edge and the lower edge 52 of the curtain. The first end 94 of the second flexible elongated member 92 may be connected to the inflatable curtain 14 by any suitable means, such as by stitching the flexible elongated member to the curtain. The second flexible elongated member 92 may comprise any suitable means, such as a cable, rope, or tether.

The apparatus 10 may also include a third tensioning device 110 (shown schematically in FIGS. 1 and 2) connected to the vehicle side structure 16. The third tensioning device 110 may be positioned on or near a B pillar 66 of the vehicle. A third flexible elongated member 112 has a first end 114 connected to the inflatable curtain 14 at a location 116 (FIG. 2) on the curtain and an opposite second end 120 connected to the third tensioning device 110. The location 116 is adjacent the lower edge 52 of the inflatable curtain 14. The first end 114 of the third flexible elongated member 112 may be connected to the inflatable curtain 14 by any suitable means, such as by stitching the flexible elongated member to the curtain. The third flexible elongated member 112 may comprise any suitable means, such as a cable, rope, or tether.

Those skilled in the art will recognize that it may be desirable to include tensioning devices in addition to the first, second and third tensioning devices 70, 90 and 110 illustrated in FIGS. 1 and 2. For example, in a vehicle having A, B, C, and D pillars (not shown) and an inflatable curtain that extends from the A pillar to the D pillar, it may be desirable to include a tensioning device connected to the vehicle side structure on or near the A, B, C, and D pillars. Accordingly, it is within the scope of the present invention to include any desired number of tensioning devices in addition to the first, second, and third tensioning devices 70, 90 and 110.

Figures 4, 5:
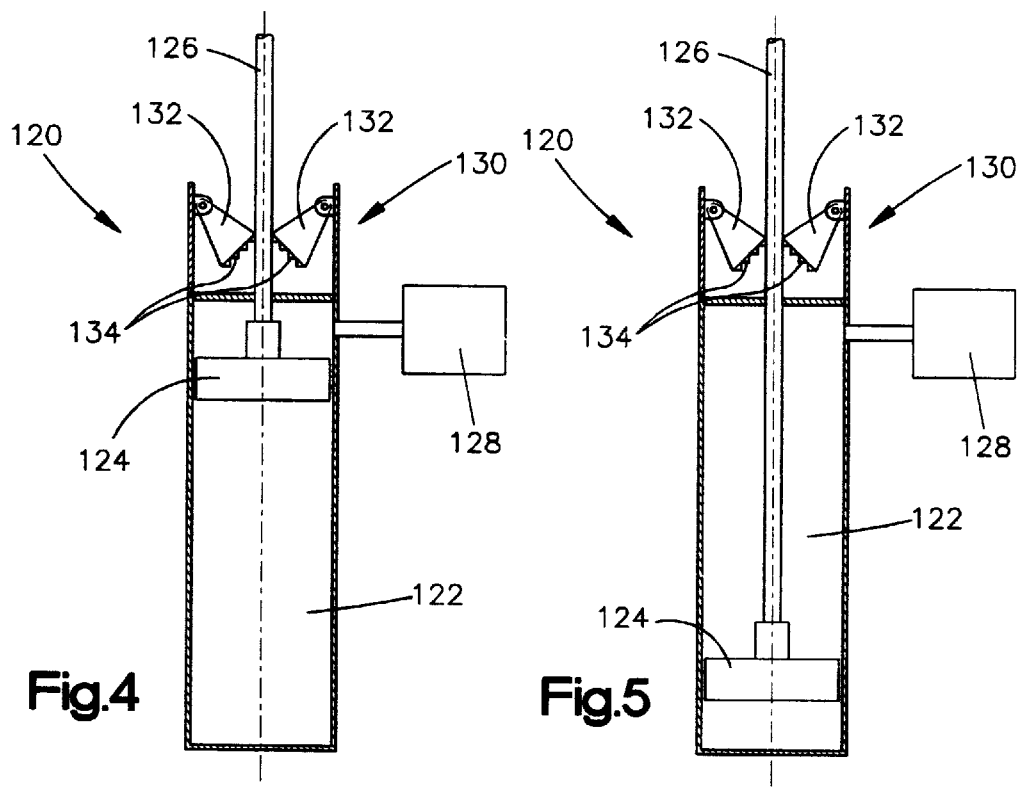
FIG. 4 is a schematic view of a portion of the apparatus illustrating parts of the apparatus in certain positions.
FIG. 5 is a schematic view similar to FIG. 4 of a portion of the apparatus illustrating parts of the apparatus in different positions.

FIGS. 4 and 5 illustrate the construction of a tensioning device 120 that is identical to the construction of the first, second, and third tensioning devices 70, 90 and 110 (FIGS. 1 and 2). As illustrated in FIG. 4, the tensioning device 120 includes a cylinder 122 and a piston 124 that is slidable in the cylinder. The piston 124 is connected to a flexible elongated member 126. The tensioning device 120 also includes a fluid source 128 that is actuatable to provide fluid to move the piston 124 along the cylinder 122 from a first position (FIG. 4) to a second position (FIG. 5). The fluid source 128 is preferably a pyrotechnic fluid source.

The tensioning device 120 includes blocking means 130. The blocking means 130 comprises a pair of jaws 132 pivotally connected to the cylinder 122. The flexible elongated member 126 extends between the jaws 132. Each of the jaws 132 has a surface that includes a plurality of teeth 134. The jaws 132 are arranged in an opposing fashion such that the teeth 134 of each jaw are presented toward the flexible elongated member 126 and the other jaw. The jaws 132 may be biased, such as by a spring, to engage the flexible elongated member 126.

The vehicle 12 includes a sensor mechanism 150 (shown schematically in FIGS. 1 and 2) for sensing a side impact to the vehicle 12 and/or a rollover of the vehicle. The sensor mechanism 150 actuates the inflator 24 in response to the sensing of a side impact or a vehicle rollover.

In the event of a rollover of the vehicle 12 or a side impact to the vehicle of a magnitude greater than a predetermined threshold value, the sensor mechanism 150 provides an electrical signal over lead wires 152 to the inflator 24. The electrical signal causes the inflator 24 to be actuated in a known manner. The inflator 24 discharges fluid under pressure into the fill tube 22. The fill tube 22 directs the fluid into the inflatable curtain 14.

The inflatable curtain 14 inflates under the pressure of the inflation fluid from the inflator 24. The housing 26 (FIG. 1) opens and the inflatable curtain 14 (FIG. 2) inflates away from the roof 18 in a downward direction as shown in the drawings and in a downward direction with respect to the direction of forward travel of the vehicle 12 into a deployed position illustrated in FIG. 2.

The inflatable curtain 14 (FIG. 2), when inflated, extends along the side structure 16 of the vehicle 12 and is positioned between the side structure and any occupant of the vehicle. When the inflatable curtain 14 is in the inflated condition, the upper edge 50 of the curtain is positioned adjacent the intersection of the roof 18 and the side structure 16 of the vehicle 12. The front edge 58 of the inflatable curtain 14 is positioned adjacent the A pillar 62 of the vehicle 12. The rear edge 60 of the inflatable curtain 14 is positioned adjacent the C pillar 64 of the vehicle 12. The inflatable curtain 14 extends between the A pillar 62 and the C pillar 64 of the vehicle 12 and overlies at least a portion of the A pillar, C pillar, and the B pillar 66 of the vehicle.

It will be recognized by those skilled in the art that the inflatable curtain may have alternative configurations. For example, in the illustrated embodiment, the inflatable curtain 14 extends between the A pillar 62 and the C pillar 64 of the vehicle 12. The inflatable curtain 14 could, however, extend between the A pillar 62 and the B pillar 66 only or between the B pillar and the C pillar 64 only. Also, in a vehicle having A, B, C, and D pillars (not shown), the inflatable curtain 14 could, when inflated, extend between the A pillar and the D pillar.

The inflatable curtain 14, when inflated, helps to protect a vehicle occupant in the event of a vehicle rollover or a side impact to the vehicle 12. Among other things, the inflated curtain 14 helps to absorb the energy of impacts with the curtain and helps to distribute the impact energy over a large area of the curtain.

The first, second and third tensioning devices 70, 90 and 110 are actuated when the inflator 24 is actuated. To describe the actuation of the tensioning devices 70, 90, and 110, reference is made to the tensioning device 120 of FIGS. 4 and 5. The fluid source 128 (FIGS. 4 and 5) is actuated when the inflator 24 is actuated. The fluid source 128 directs a fluid into the cylinder 122, which causes the piston 124 to move from the first position (FIG. 4) towards the second position (FIG. 5). The piston 124 moves the flexible elongated member 126 in a direction along the cylinder 122 towards the second position, which tensions the flexible elongated member.

As the flexible elongated member 126 moves between the jaws 132 in the direction along the cylinder 122 from the first position (FIG. 4) towards the second position (FIG. 5), the jaws are urged away from the flexible elongated member and away from each other by the movement of the flexible elongated member. This allows the flexible elongated member 126 to move freely between the jaws 132. Movement of the flexible elongated member 126 between the jaws 132 in an opposite direction, towards the first position, urges the jaws towards the flexible elongated member and towards each other. This causes the teeth 134 to clamp onto the flexible elongated member 126, which blocks movement of the flexible elongated member 126 in the direction towards the first position.

Those skilled in the art will recognize that the blocking means 130 may have an alternative configuration. For example, the blocking means 130 may comprise a ratchet mechanism. As a further alternative, the blocking means 130 may have any suitable configuration that permits the flexible elongated member 126 to move in a direction along the cylinder towards the second position (FIG. 5) and blocks movement of the flexible elongated member towards the first position (FIG. 4).

When the first tensioning device 70 (FIGS. 1 and 2) is actuated, the piston of the first tensioning device moves the second end 80 of the first flexible elongated member 72 in a first direction, indicated generally by the arrow 160 in FIG. 2. This movement tensions the first flexible elongated member in the first direction. The first direction is generally downward and forward in the vehicle 12. The blocking means of the first tensioning device 70 blocks movement of the first flexible elongated member 72 in a direction opposite the first direction. Thus, the first tensioning device 70 helps to move the inflatable curtain 14 towards the deployed position of FIG. 2. The first tensioning device 70 also helps maintain the inflatable curtain 14 in the deployed position adjacent the vehicle side structure 16 and between the side structure and any occupant of the vehicle 12.

When the second tensioning device 90 (FIGS. 1 and 2) is actuated, the piston of the second tensioning device moves the second end 100 of the second flexible elongated member 92 in a second direction, different than the first direction. This movement tensions the second flexible elongated member in the second direction. The second direction is indicated generally by the arrow 162 in FIG. 2. The second direction is generally downward and rearward in the vehicle 12. The blocking means of the second tensioning device 90 blocks movement of the second flexible elongated member 92 in a direction opposite the second direction. Thus, the second tensioning device 90 helps to move the inflatable curtain 14 towards the deployed position of FIG. 2. The second tensioning device 90 also helps maintain the inflatable curtain 14 in the deployed position adjacent the vehicle side structure 16 and between the side structure and any occupant of the vehicle 12.

When the third tensioning device 110 (FIGS. 1 and 2) is actuated, the piston of the third tensioning device moves the second end 120 of the third flexible elongated member 112 in a third direction indicated generally by the arrow 164 in FIG. 2. The third direction is generally downward in the vehicle 12. This tensions the third flexible elongated member 112 in the third direction. The blocking means of the third tensioning device 110 blocks movement of the third flexible elongated member 112 in a direction opposite the third direction. Thus, the third tensioning device 110 helps to move the inflatable curtain 14 towards the deployed position of FIG. 2. The third tensioning device 110 also helps maintain the inflatable curtain 14 in the deployed position adjacent the vehicle side structure 16 and between the side structure and any occupant of the vehicle 12.

As the inflatable curtain 14 (FIGS. 1 and 2) is inflated, the curtain slides along the intermediate portion 82 of the first flexible elongated member 72 at the location 84. Also, as the inflatable curtain 14 inflates and the first flexible elongated member 72 is tensioned by the first tensioning device 70, the inflating curtain applies a force to the intermediate portion 82 of the first flexible elongated member 72 that opposes the force applied by the tensioning device. The force applied to the first flexible elongated member 72 by the inflatable curtain 14 increases as the curtain inflates and ultimately increases to a point at which the force stops further movement of the piston of the first tensioning device 70 in the first direction. The force applied by the curtain 14 stops further movement of the piston before the piston reaches its end of travel in the cylinder.

As the inflatable curtain 14 is inflated and the second flexible elongated member 92 is tensioned by the second tensioning device 90, the inflating curtain applies a force to the second flexible elongated member 92 that opposes the force applied by the second tensioning device. The force applied to the second flexible elongated member 92 by the inflatable curtain 14 increases as the curtain inflates and ultimately increases to a point at which the force stops further movement of the piston of the second tensioning device 90 in the second direction. The force applied by the curtain 14 stops further movement of the piston before the piston reaches its end of travel in the cylinder.

As the inflatable curtain 14 is inflated and the third flexible elongated member 112 is tensioned by the third tensioning device 110, the inflating curtain applies a force to the third flexible elongated member 112 that opposes the force applied by the third tensioning device. The force applied to the third flexible elongated member 112 by the inflatable curtain 14 increases as the curtain inflates and ultimately increases to a point at which the force stops further movement of the piston of the third tensioning device 110 in the third direction. The force applied by the curtain 14 stops further movement of the piston before the piston reaches its end of travel in the cylinder.

From the above description of the invention, those skilled in the art will perceive improvements, changes and modifications. For example, in the illustrated embodiment, the tensioning devices are used to tension an inflatable vehicle occupant protection device in the form of an inflatable curtain. The tensioning devices, however, could be used to tension alternative types of inflatable vehicle occupant protection device, such as inflatable tubular structures. Such improvements, changes and modifications within the skill of the art are intended to be covered by the appended claims.

Having described the invention, the following is claimed:

1. Apparatus for helping to protect an occupant of a vehicle that has a side structure and a roof, said apparatus comprising:

an inflatable vehicle occupant protection device that is inflatable away from the vehicle roof into a deployed position between the side structure of the vehicle and a vehicle occupant;

an inflation fluid source that is actuatable to provide inflation fluid for inflating said inflatable vehicle occupant protection device;

a first tensioning device comprising a cylinder, a piston that is slidable in said cylinder, and a fluid source actuatable to provide fluid for moving said piston from a first position towards a second position in said cylinder; and a first flexible elongated member having a first end connected to the vehicle side structure and an opposite second end connected to said piston, said first flexible elongated member having an intermediate portion between said first and second ends extending through said inflatable vehicle occupant protection device, said fluid source when actuated moving said piston in a first direction towards said second position, said tensioning device tensioning said first flexible elongated member and helping to move said inflatable vehicle occupant protection device towards said deployed position, said inflatable vehicle occupant protection device providing resistance to movement of said piston in said first direction towards said second position, said resistance increasing to a point at which said resistance prevents movement of said piston towards said second position.

2. Apparatus as defined in claim 1, wherein said inflatable vehicle occupant protection device is an inflatable curtain having a stored position extending along the side structure adjacent the vehicle roof, said inflatable curtain moving from stored position to said deployed position when said inflatable curtain is inflated.

3. Apparatus as defined in claim 1, wherein said first tensioning device blocks movement of said piston in a direction opposite said first direction.

4. Apparatus as defined in claim 1, further comprising a second tensioning device connected to said inflatable vehicle occupant protection device, said second tensioning device tensioning said inflatable vehicle occupant protection device in a second direction, different than said first direction, and helping to move said inflatable vehicle occupant protection device towards said deployed position.

5. Apparatus as defined in claim 4, wherein said second tensioning device comprises a cylinder, a piston that is slidable in said cylinder, and a fluid source actuatable to provide fluid for moving said piston in said second direction from a first position towards a second position in said cylinder, said inflatable vehicle occupant protection device being connected to said piston.

6. Apparatus as defined in claim 5, wherein said apparatus further includes a second flexible elongated member for connecting said second tensioning device to said inflatable vehicle occupant protection device, said second flexible elongated member having a first end connected to said inflatable vehicle occupant protection device and an opposite second end connected to said piston of said second tensioning device, said piston of said second tensioning device moving in said second direction when said second tensioning device is actuated, said second tensioning device tensioning said inflatable vehicle occupant protection device in said second direction and blocking movement of said piston of said second tensioning device in a direction opposite said second direction.

7. Apparatus as defined in claim 6, wherein said inflatable vehicle occupant protection device resists movement of said piston of said second tensioning device in said second direction toward said second position, said resistance increasing as said inflatable vehicle occupant protection device is inflated to a point at which said resistance prevents further movement of said piston of said second tensioning device towards said second position.

8. Apparatus as defined in claim 7, wherein said inflatable vehicle occupant protection device has a perimeter at least partially defined by upper and lower edges of said inflatable vehicle occupant protection device and front and rear portions spaced apart horizontally along said upper and lower edges.

9. Apparatus as defined in claim 8, wherein said first direction is generally downward and forward in the vehicle, and said second direction is generally downward and rearward in the vehicle.

10. Apparatus as defined in claim 8, wherein said first flexible elongated member extends through said inflatable vehicle occupant protection device at a location on said front portion adjacent said lower edge of said inflatable vehicle occupant protection device, and said second flexible elongated member is connected to said inflatable vehicle occupant protection device at a location on said rear portion adjacent said lower edge of said inflatable vehicle occupant protection device.

11. Apparatus as defined in claim 8, wherein said front portion of said inflatable vehicle occupant protection device is at least partially defined by a front edge of said inflatable vehicle occupant protection device extending between said upper and lower edges of said inflatable vehicle occupant protection device, and said rear portion of said inflatable vehicle occupant protection device is at least partially defined by a rear edge of said inflatable vehicle occupant protection device extending between said upper and lower edges of said inflatable vehicle occupant protection device.

12. Apparatus as defined in claim 11, wherein said first flexible elongated member extends through said inflatable vehicle occupant protection device at a location adjacent an intersection of said front edge and said lower edge of said inflatable vehicle occupant protection device, and said second flexible elongated member is connected to said inflatable vehicle occupant protection device at a location adjacent an intersection of said rear edge and said lower edge of said inflatable vehicle occupant protection device.

13. Apparatus as defined in claim 12, further comprising a third tensioning device connected to said inflatable vehicle occupant protection device at a location between said front and rear portions of said inflatable vehicle occupant protection device adjacent said lower edge of said inflatable vehicle occupant protection device, said third tensioning device tensioning said inflatable vehicle occupant protection device in a third direction towards said deployed position.

14. Apparatus as defined in claim 13, wherein said third tensioning device is connected to the vehicle at a location on or near a B pillar of the vehicle.

15. Apparatus as defined in claim 13, wherein said third tensioning device comprises a cylinder, a piston that is slidable in said cylinder, and a fluid source actuatable to provide fluid for moving said piston in said third direction from a first position towards a second position in said cylinder, said inflatable vehicle occupant protection device being connected to said piston.

16. Apparatus as defined in claim 15, wherein said apparatus further includes a third flexible elongated member for connecting said third tensioning device to said inflatable vehicle occupant protection device, said third flexible elongated member having a first end connected to said inflatable vehicle occupant protection device and an opposite second end connected to said piston of said third tensioning device, said piston of said third tensioning device moving in said third direction when said third tensioning device is actuated, said third tensioning device tensioning said inflatable vehicle occupant protection device in said third direction and blocking movement of said piston of said third tensioning device in a direction opposite said third direction.

17. Apparatus as defined in claim 16, wherein said inflatable vehicle occupant protection device resists movement of said piston of said third tensioning device in said third direction toward said second position by applying force to said third flexible elongated member, said resistance increasing as said inflatable vehicle occupant protection device is inflated to a point at which said resistance prevents further movement of said piston of said third tensioning device towards said second position.

18. Apparatus as defined in claim 17, wherein said third direction is generally downward in the vehicle.

19. Apparatus as defined in claim 4, wherein said second tensioning device is connected to the vehicle at a location on or near a C pillar of the vehicle.

20. Apparatus as defined in claim 1, wherein said first tensioning device is connected to the vehicle at a location on or near an A pillar of the vehicle.

21. Apparatus as defined in claim 1, further including a fill tube having a portion located in said inflatable vehicle occupant protection device, said inflation fluid source being in fluid communication with said fill tube, said inflation fluid source, when actuated, providing inflation fluid to said fill tube, said fill tube directing said inflation fluid into said inflatable vehicle occupant protection device to inflate said inflatable vehicle occupant protection device.

22. Apparatus as defined in claim 1, wherein said inflatable vehicle occupant protection device when inflated extends along the side structure of the vehicle between an A pillar and a C pillar of the vehicle.

23. Apparatus as defined in claim 1, wherein said inflatable vehicle occupant protection device, when inflated, overlies at least a portion of an A pillar, a B pillar and a C pillar of the vehicle.

24. Apparatus as defined in claim 1, further comprising a sensor for sensing a vehicle condition for which deployment of said inflatable vehicle occupant protection device is desired, said sensor actuating said inflation fluid source to provide inflation fluid to inflate said inflatable vehicle occupant protection device.

25. Apparatus as defined in claim 1, wherein said inflation fluid source comprises an inflator that is actuatable to inflate said inflatable vehicle occupant protection device.

26. Apparatus as defined in claim 1, wherein said resistance prevents movement of said piston towards said second position before said piston reaches said second position.

27. Apparatus as defined in claim 1, wherein said inflatable vehicle occupant protection device resists movement of said piston in said first direction by applying force to said intermediate portion of said first flexible elongated member.

28. Apparatus as defined in claim 1, wherein said fluid source is actuated when said inflation fluid source is actuated.

29. Apparatus for helping to protect an occupant of a vehicle that has a side structure and a roof, said apparatus comprising:

an inflatable vehicle occupant protection device that is inflatable away from the vehicle roof into a deployed position between the side structure of the vehicle and a vehicle occupant;

an inflation fluid source that is actuatable to provide inflation fluid for inflating said inflatable vehicle occupant protection device;

a first tensioning device connected to said inflatable vehicle occupant protection device at a first location on said inflatable vehicle occupant protection device, said first tensioning device comprising a first flexible elongated member and first tensioning mechanism for tensioning said first flexible elongated member, said first flexible elongated member having a first end connected to the vehicle side structure and an opposite second end connected to said first tensioning mechanism, said first flexible elongated member having an intermediate portion between said first and second ends extending through said inflatable vehicle occupant protection device, said first tensioning mechanism tensioning said first flexible elongated member in a first direction to tension said inflatable vehicle occupant protection device towards said deployed position when said first tensioning device is actuated, said first tensioning device resisting movement of said inflatable vehicle occupant protection device in a direction generally opposite said first direction; and a second tensioning device connected to said inflatable vehicle occupant protection device at a second location on said inflatable vehicle occupant protection device, said second tensioning device tensioning said inflatable vehicle occupant protection device in a second direction, different than said first direction, towards said deployed position, said second tensioning device resisting movement of said inflatable vehicle occupant protection device in a direction generally opposite said second direction.

30. Apparatus as defined in claim 29, wherein said inflatable vehicle occupant protection device is an inflatable curtain having a stored position extending along the side structure adjacent the vehicle roof, said inflatable curtain moving from stored position to said deployed position when said inflatable curtain is inflated.

31. Apparatus as defined in claim 29, wherein said first direction is generally downward and forward in the vehicle, and said second direction is generally downward and rearward in the vehicle.

32. Apparatus as defined in claim 31, wherein said inflatable vehicle occupant protection device has a perimeter at least partially defined by upper and lower edges of said inflatable vehicle occupant protection device and front and rear portions spaced apart horizontally along said upper and lower edges.

33. Apparatus as defined in claim 32, wherein said first tensioning device is connected to said inflatable vehicle occupant protection device at a location on said front portion adjacent said lower edge of said inflatable vehicle occupant protection device, and said second tensioning device is connected to said inflatable vehicle occupant protection device at a location on said rear portion adjacent said lower edge of said inflatable vehicle occupant protection device.

34. Apparatus as defined in claim 32, wherein said front portion of said inflatable vehicle occupant protection device is at least partially defined by a front edge of said inflatable vehicle occupant protection device extending between said upper and lower edges of said inflatable vehicle occupant protection device, and said rear portion of said inflatable vehicle occupant protection device is at least partially defined by a rear edge of said inflatable vehicle occupant protection device extending between said upper and lower edges of said inflatable vehicle occupant protection device.

35. Apparatus as defined in claim 34, wherein said first tensioning device is connected to said inflatable vehicle occupant protection device at a location adjacent an intersection of said front edge and said lower edge of said inflatable vehicle occupant protection device, and said second tensioning device is connected to said inflatable vehicle occupant protection device at a location adjacent an intersection of said rear edge and said lower edge of said inflatable vehicle occupant protection device.

36. Apparatus as defined in claim 29, wherein said first tensioning mechanism comprises a cylinder, a piston that is slidable in said cylinder, and a fluid source actuatable to provide fluid for moving said piston from a first position towards a second position in said cylinder, said first flexible elongated member having a first end connected to the vehicle side structure and an opposite second end connected to said piston, said first flexible elongated member extending through said inflatable vehicle occupant protection device;

said piston moving in said first direction when said first tensioning mechanism is actuated, said first tensioning mechanism tensioning said first flexible elongated member and helping to move said inflatable vehicle occupant protection device towards said deployed position;

said inflatable vehicle occupant protection device providing resistance to movement of said piston in said first direction toward said second position, said resistance increasing as said inflatable vehicle occupant protection device is inflated to a point at which said resistance prevents further movement of said piston towards said second position, said first tensioning mechanism blocking movement of said piston in a direction opposite said first direction.

37. Apparatus as defined in claim 29, wherein said second tensioning device comprises a cylinder, a piston that is slidable in said cylinder, and a fluid source actuatable to provide fluid for moving said piston from a first position towards a second position in said cylinder, said second tensioning device further comprising a second flexible elongated member having a first end connected to said inflatable vehicle occupant protection device and an opposite second end connected to said piston, said piston moving in said second direction when said second tensioning device is actuated, said second flexible elongated member being tensioned and helping to move said inflatable vehicle occupant protection device towards said deployed position, said inflatable vehicle occupant protection device providing resistance to movement of said piston in said second direction toward said second position, said resistance increasing as said inflatable vehicle occupant protection device is inflated to a point at which said resistance prevents further movement of said piston towards said second position, said second tensioning device blocking movement of piston in a direction opposite said second direction.

38. Apparatus for helping to protect an occupant of a vehicle that has a side structure and a roof, said apparatus comprising:

an inflatable vehicle occupant protection device that is inflatable away from the vehicle roof into a deployed position between the side structure of the vehicle and a vehicle occupant;

an inflation fluid source that is actuatable to provide inflation fluid for inflating said inflatable vehicle occupant protection device;

a first tensioning device comprising a cylinder, a piston that is slidable in said cylinder, and a fluid source actuatable to provide fluid for moving said piston from a first position towards a second position in said cylinder;

a first flexible elongated member having a first end connected to the vehicle side structure and an opposite second end connected to said piston, said first flexible elongated member having an intermediate portion between said first and second ends extending through said inflatable vehicle occupant protection device; and a second tensioning device connected to said inflatable vehicle occupant protection device, said fluid source when actuated moving said piston in a first direction towards said second position, said tensioning device tensioning said first flexible elongated member and helping to move said inflatable vehicle occupant protection device towards said deployed position, said inflatable vehicle occupant protection device providing resistance to movement of said piston in said first direction towards said second position, said resistance increasing to a point at which said resistance prevents movement of said piston towards said second position, said second tensioning device tensioning said inflatable vehicle occupant protection device in a second direction, different than said first direction, and helping to move said inflatable vehicle occupant protection device towards said deployed position.

39. Apparatus for helping to protect an occupant of a vehicle that has a side structure and a roof, said apparatus comprising:
an inflatable vehicle occupant protection device that is inflatable away from the vehicle roof into a deployed position between the side structure of the vehicle and a vehicle occupant;
an inflation fluid source that is actuatable to provide inflation fluid for inflating said inflatable vehicle occupant protection device;
a tensioning device comprising a cylinder connected to a pillar of the vehicle, a piston movable in the cylinder, and a flexible elongated member, said flexible elongated member having a first end connected to the pillar and an opposite second end connected to said piston, said flexible elongated member extending through said inflatable vehicle occupant protection device, said piston moving in said cylinder when said tensioning device is actuated, said piston tensioning said flexible elongated member and helping to move said inflatable vehicle occupant protection device towards said deployed position, said inflatable vehicle occupant protection device providing resistance to movement of said piston in said cylinder, said resistance increasing to a point at which said resistance prevents movement of said piston in said cylinder.

40. Apparatus for helping to protect an occupant of a vehicle that has a side structure and a roof, said apparatus comprising:
an inflatable vehicle occupant protection device that is inflatable away from the vehicle roof into a deployed position between the side structure of the vehicle and a vehicle occupant;
an inflation fluid source that is actuatable to provide inflation fluid for inflating said inflatable vehicle occupant protection device;
a first tensioning device comprising a cylinder and a piston that is movable in said cylinder from a first end of said cylinder toward a second end of said cylinder in response to fluid pressure acting on said piston; and
a first flexible elongated member having a first portion associated with said inflatable vehicle occupant protection device and a second portion connected to said piston,
said piston when moving in said cylinder in response to fluid pressure acting on said piston tensioning said first flexible elongated member and helping to move said inflatable vehicle occupant protection device towards said deployed position,
said inflatable vehicle occupant protection device providing resistance to movement of said piston in said cylinder, said resistance increasing to a point at which said resistance stops movement of said piston in said cylinder when said piston is positioned proximate said second end of said cylinder.

41. Apparatus as recited in claim 40, wherein said inflatable vehicle occupant protection device when inflated extends from an A pillar of the vehicle to a C pillar of the vehicle.

42. Apparatus as recited in claim 40, wherein the side structure of the vehicle includes at least one side window, said inflatable vehicle occupant protection device when inflated extending from an upper edge of the at least one side window to a lower edge of said at least one side window.

43. Apparatus as recited in claim 40, further comprising:
a second tensioning device comprising a cylinder and a piston that is movable in said cylinder from a first end of said cylinder toward a second end of said cylinder in response to fluid pressure acting on said piston; and
a second flexible elongated member having a first portion associated with said inflatable vehicle occupant protection device and a second portion connected to said piston,
said piston of said second tensioning device when moving in said cylinder in response to fluid pressure acting on said piston tensioning said second flexible elongated member and helping to move said inflatable vehicle occupant protection device towards said deployed position,
said inflatable vehicle occupant protection device providing resistance to movement of said piston of said second tensioning device in said cylinder, said resistance increasing to a point at which said resistance stops movement of said piston in said cylinder when said piston is positioned proximate said second end of said cylinder.

* * * * *